Sept. 23, 1941.  A. B. WELTY  2,256,821
GRAIN TANK FOR HARVESTER-THRESHERS
Filed March 2, 1939
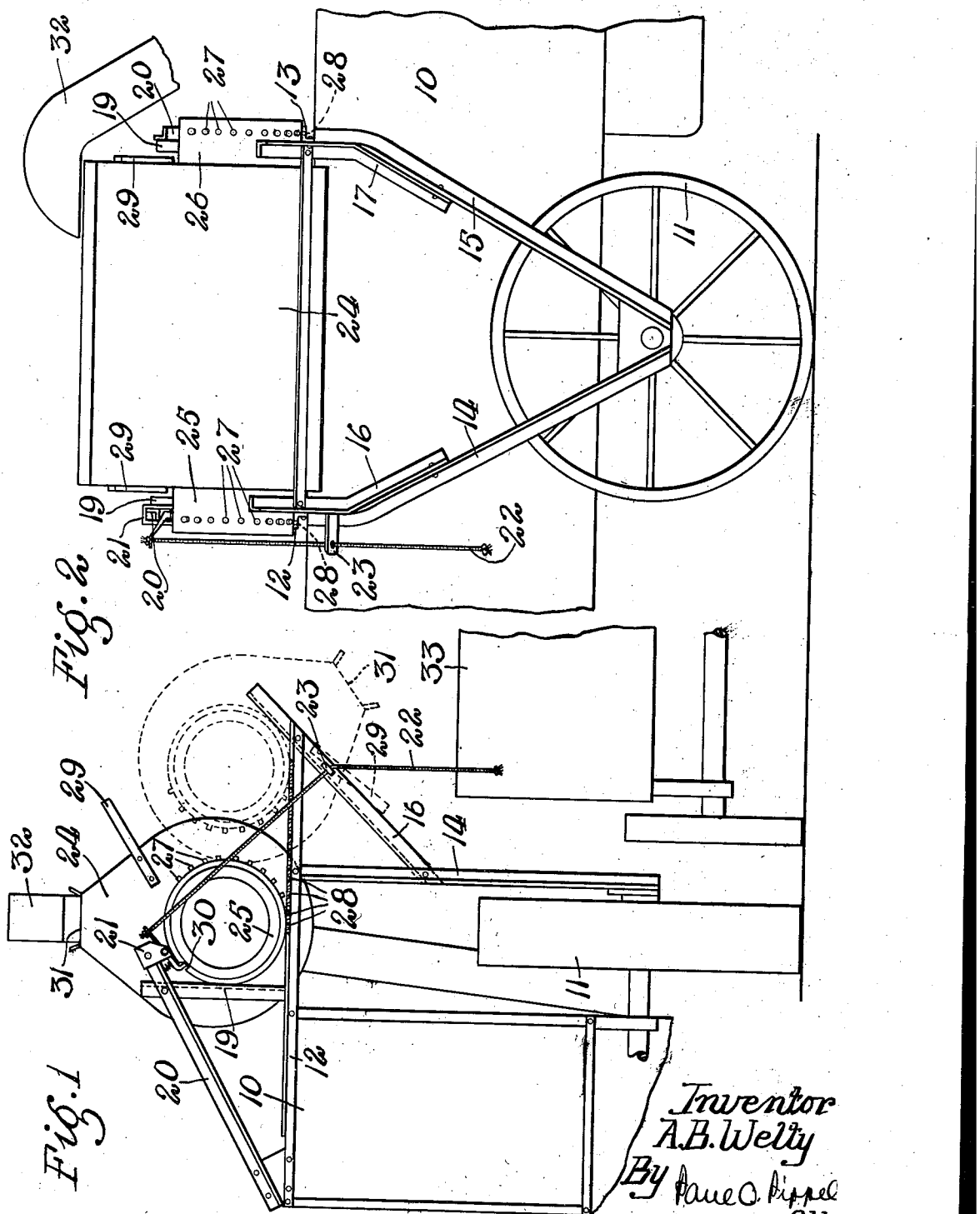
Inventor
A.B. Welty
By Paul O. Pippel
Atty.

Patented Sept. 23, 1941

2,256,821

UNITED STATES PATENT OFFICE 2,256,821

GRAIN TANK FOR HARVESTER-THRESHERS

Albert B. Welty, Moline, Ill., assignor to International Harvester Company, a corporation of New Jersey Application March 2, 1939, Serial No. 259,407

1 Claim. (Cl. 56—122)

This invention relates to a grain tank for use with harvester threshers and the like. More specifically, it relates to an arrangement for dumping the grain tank of such a machine.

It is the usual practice to provide as a part of a harvester thresher a grain tank of considerable capacity, into which the threshed grain is conveyed and which may be unloaded from time to time into a wagon alongside the thresher. In some instances, these grain tanks have been rigidly mounted on the thresher and have sloping bottoms which facilitate the unloading of the grain. The disadvantage of this type of grain tank is that it must be made of large dimensions for a reasonable capacity because the sloping bottom of the tank reduces considerably the effective cross-sectional area of the tank. In other instances the grain tanks have been of circular or partially circular section and rotatably mounted on the thresher, so that they may be rotated about a fixed axis to effect dumping of the grain. A disadvantage of this type of grain tank is that it is difficult to bring a wagon into position adjacent the thresher so that the grain may be conveniently received from the grain tank. Under the present invention, the grain tank is of generally circular shape and rolls along the framework of the thresher from a loading position up to a dumping position substantially beyond the wheel line, where it is over a wagon which receives the dumped grain.

An object of the present invention is the provision of an improved grain tank for a harvester thresher or the like machine.

A further object is the provision of a grain tank of relatively large capacity for small overall dimensions.

Another object is to provide a thresher construction which permits of easy dumping of a grain tank.

According to the present invention, a grain tank of generally circular shape is mounted on framework extending outwardly from the upper surface of the thresher body beyond the wheel line of the thresher. The grain tank rests upon the framework by means of circular end members having projections, by means of which members the grain tank is adapted to roll from a loading position substantially over a wheel to a dumping position beyond the wheel line, the projections engaging recesses successively in the framework in the movement from the loading position to the dumping position.

In the drawing:

Figure 1 shows a front elevational view of a portion of a harvester thresher including a grain tank with a wagon standing alongside; and, Figure 2 is a side elevational view of the same portion of the harvester thresher.

The harvester thresher construction of the present invention includes a thresher body 10 carried by wheels 11, only one of which is shown. A supporting structure is provided by the angle members 12 and 13 which extend upwardly from the upper surface of the thresher body 10 substantially beyond the wheel 11. Angle members 14 and 15 extend upwardly from the wheel 11 and support the track-like angle members 12 and 13, respectively. Angle members 16 and 17 extend from an intermediate point of the members 14 and 15 to and beyond the extreme ends of the members 12 and 13.

Upright members 19 extend upwardly from the angle members 12 and 13 at a point adjacent the thresher body 10 and support angle members 20, also connected with the thresher body 10. At the end of the one member 20, a latch 21 is attached and has a control cord 22 extending down through an opening in a piece 23 secured on the member 16. A receptacle in the form of a grain tank 24 has a generally cylindrical shape, being of circular section except for a portion at the top, as viewed in Figure 1. Circular members 25 and 26 are attached to the ends of the grain tank 24 in concentric relation with the arcuate portions of the tank. The members 25 and 26 have projections 27, which are adapted to engage openings 28 in the angle members 12 and 13. A handle member 29 extends from one side of the grain tank. The end member 25 has a recess 30, which is adapted to be engaged by the latch 21.

The grain tank shown in Figure 1 is in loading position with a mouth portion 31 extending upwardly and adapted to receive threshed grain from an elevator or conveyer 32, which is in communication with the thresher body. When the grain tank has been filled, and it is desired to empty it into a wagon 33 positioned alongside of the thresher, the latch 21 is released and the tank is allowed to roll from the full line position over the wheel 11 along the angle members 12 and 13 to the dotted line dumping position. It will be observed that the mouth 31 of the tank extends downwardly, so that the tank empties into the wagon 33. Movement of the tank beyond the ends of the members 12 and 13 is prevented by the angle members 16 and 17. When the tank has been emptied, it may be rolled back to the original full line position by means of the handle 29, where it is held by reattachment of the latch 21 in the recess 30 of the end member 25. This same handle 29 may be used for initiating the rolling of the tank from loading to dumping position in case the tank does not roll of its own accord when the latch 21 is released. It is to be noted that the center of gravity of the filled tank will be above the center of the circular members 25 and 26 in the loading position because the upper end of the tank is shaped outwardly beyond the circular. Consequently, the center of gravity of the filled tank is above the center of rolling and the tank will automatically roll to the dumping position as soon as the latch is released, so long as the center of gravity is not absolutely over the center of rolling. It will be observed that the tank has moved bodily in going from loading position to dumping position, so that it is well beyond the wheel line and over the wagon into which it is dumped. Thus, dumping is effected much more efficiently than it would be in the case where the grain tank remains in its original loading position for dumping and merely was rotated about its own axis. By virtue of the projections 27 on the circular members 25 and 26 and the recesses 28 in the angle members 12 and 13, any tendency of the tank to slip in rolling with respect to the angle members is prevented. Thus, a return of the tank to its original position with the mouth extending straight up is assured when the tank is against the upright member 19.

It will be seen from the foregoing description that a novel thresher construction has been provided, by which a grain tank is moved simply and easily from a loading position well over the thresher body itself to a position well beyond the wheel line where it is directly over a wagon receiving the grain as it is dumped.

The invention is obviously applicable to any form of crop-handling apparatus which has a container or tank for storing the crop.

It is to be understood that the invention is to be limited only within the scope of the appended claim.

What is claimed is:

For a thresher having a body, a wheel supporting the same, a framework extending from the body and into an overhanging position with respect to the wheel laterally from the body, horizontal track-like tank supporting means disposed on said framework, a grain tank mounted above said supporting means, said tank having a grain receiving opening at the top thereof and being provided with an arcuate supporting portion in rolling engagement with the supporting means on the frame structure, said arcuate portion have a center below the center of gravity of a loaded tank in upright grain receiving position, means to deliver grain to said tank and releasable tank retaining means, said tank when loaded being readily tilted when released for rolling along the frame work to a top downward wheel-overhanging dumping position.

ALBERT B. WELTY.